(12) United States Patent
Zhang et al.

(10) Patent No.: US 11,442,888 B2
(45) Date of Patent: Sep. 13, 2022

(54) SERIAL COMMUNICATION APPARATUS FOR UNIDIRECTIONAL COMMUNICATION BETWEEN CHIPS OF RADIO FREQUENCY FRONT-END MODULE AND INSIDE THE CHIPS

(71) Applicants: Qihua Zhang, Tianjin (CN); Yunfang Bai, Tianjin (CN)

(72) Inventors: Qihua Zhang, Tianjin (CN); Yunfang Bai, Tianjin (CN)

(73) Assignee: VANCHIP (TIANJIN) TECHNOLOGY CO., LTD., Tianjin (CN)

( * ) Notice: Subject to any disclaimer, the term of this patent is extended or adjusted under 35 U.S.C. 154(b) by 0 days.

(21) Appl. No.: 17/138,530

(22) Filed: Dec. 30, 2020

(65) Prior Publication Data

US 2021/0117366 A1 Apr. 22, 2021

Related U.S. Application Data

(63) Continuation of application No. PCT/CN2019/093618, filed on Jun. 28, 2019.

(51) Int. Cl.
*G06F 13/42* (2006.01)
*G06F 1/06* (2006.01)
*H04B 1/40* (2015.01)

(52) U.S. Cl.
CPC ............ *G06F 13/4291* (2013.01); *G06F 1/06* (2013.01); *H04B 1/40* (2013.01)

(58) Field of Classification Search
CPC .................................................. G06F 13/4291
See application file for complete search history.

(56) References Cited

U.S. PATENT DOCUMENTS

| 8,521,101 | B1 * | 8/2013 | Kadam | ...................... H04L 7/04 455/91 |
| 2017/0091143 | A1 * | 3/2017 | Ross | .................... G06F 13/4286 |
| 2017/0192918 | A1 * | 7/2017 | Tenbroek | ............ G06F 13/4291 |
| 2019/0302830 | A1 * | 10/2019 | Chen | .......................... G06F 1/08 |

\* cited by examiner

*Primary Examiner* — David E Martinez
(74) *Attorney, Agent, or Firm* — George Guosheng Wang; Upstream Research and Patent LLC

(57) ABSTRACT

Disclosed are a serial communication apparatus and a serial communication method. The serial communication apparatus comprises a radio frequency front-end module and a radio frequency device, a first input interface and a second input interface of the radio frequency front-end module being correspondingly connected to output interfaces of a main control module, a first output interface of the radio frequency front-end module being connected to a first input interface of the at least one radio frequency device via a first signal bus, a second output interface of the radio frequency front-end module being connected to a second input interface of the at least one radio frequency device via a second signal bus. The present invention satisfies requirements for convenient and rapid unidirectional communication between various chips of the radio frequency front-end module and inside the chips, reduces communication complexity, and increases transmission efficiency.

12 Claims, 13 Drawing Sheets

SERIAL COMMUNICATION APPARATUS FOR UNIDIRECTIONAL COMMUNICATION BETWEEN CHIPS OF RADIO FREQUENCY FRONT-END MODULE AND INSIDE THE CHIPS

BACKGROUND

Technical Field

The present invention relates to a serial communication apparatus and a corresponding serial communication method.

Related Art

As applications in which a radio frequency front end (RF front end) is adopted becomes increasingly complex, a number of required chips such as power amplifiers, radio frequency switches, low-noise power amplifiers, and filters increases accordingly. In this case, a state of each chip of a radio frequency front-end module in an actual application needs to be switched through a respective control signal. For a chip that does not have too many states, a general-purpose input output (GPIO) interface is commonly adopted in the prior art to control changes in the states of the chip through a combination of states of a high level "1" and a low level "0."

However, as the complexity and functions of applications in which radio frequency front ends are adopted increase, each chip also has more and more functions, and it is impractical to further increase a number of GPIO control signal lines. Therefore, mobile industry processor interface (MIPI) interfaces have come into being in the field of mobile phones. However, with costs increasing with each passing day, adopting the MIPI interfaces for communication between chips within a radio frequency front-end module results in an increased complexity of the chips, thus reducing efficiency of internal communication.

SUMMARY

To overcome the disadvantages of the prior art, the present invention provides a serial communication apparatus, a serial communication method, and a semiconductor device including the above serial communication apparatus.

According to a first aspect of the present invention, a serial communication apparatus is provided, the apparatus including a radio frequency front-end module and radio frequency devices. A first input interface and a second input interface of the radio frequency front-end module are respectively connected to output interfaces of a main control module, and when a first output interface of the radio frequency front-end module is connected to a first input interface of at least one of the radio frequency devices via a first signal bus, a second output interface of the radio frequency front-end module is connected to a second input interface of the at least one of the radio frequency devices via a second signal bus.

According to a second aspect of the present invention, a serial communication apparatus is provided, the apparatus including a radio frequency front-end module and radio frequency devices. A first input interface and a second input interface of the radio frequency front-end module are respectively connected to output interfaces of a main control module, at least one first output interface of the radio frequency front-end module is connected to a first input interface of at least one of the radio frequency devices via a first signal bus, and at least one second output interface of the radio frequency front-end module is connected to a second input interface of the at least one of the radio frequency devices via a second signal bus.

According to a third aspect of embodiments of the present invention, a serial communication apparatus is provided, the apparatus including a radio frequency front-end module and radio frequency devices. A first input interface and a second input interface of the radio frequency front-end module are respectively connected to output interfaces of a main control module, a first output interface of the radio frequency front-end module is connected to a first input interface of a first one of the radio frequency devices via a first signal bus, a second output interface of the radio frequency front-end module is connected to a second input interface of the first one of the radio frequency devices via a second signal bus, and starting from the first one of the radio frequency devices, the radio frequency devices are successively connected via the first signal bus and the second signal bus respectively.

In preferred embodiments, the radio frequency front-end module includes a first detection circuit, a first clock generation circuit, and a transmission circuit. A first input interface and a second input interface of the first detection circuit are respectively connected to the output interfaces of the main control module, the first detection circuit is connected to an input interface of the first clock generation circuit via one or more clock enable buses, an output interface of the first clock generation circuit is connected to a first input interface of the transmission circuit, and an output interface of the first detection circuit is connected to a second input interface of the transmission circuit.

In preferred embodiments, the first input interface and the second input interface include but are not limited to MIPI interfaces or GIPO interfaces.

In preferred embodiments, the radio frequency front-end module further includes a first power-on reset circuit, wherein the first power-on reset circuit is connected to the transmission circuit.

In preferred embodiments, when valid SIPI data received by each of the radio frequency devices contains a clock signal, the radio frequency device includes a second power-on reset circuit and a receiving circuit. The second power-on reset circuit is connected to the receiving circuit, and when a first input interface of the receiving circuit is connected to a first output interface of a transmission circuit via the first signal bus, a second input interface of the receiving circuit is connected to a second output interface of the transmission circuit via the second signal bus, or the second input interface of the receiving circuit is connected to a corresponding second output interface of the transmission circuit via the second signal bus.

In preferred embodiments, when valid SIPI data received by each of the radio frequency devices contains a clock signal, the radio frequency device includes a second power-on reset circuit and a receiving circuit. The second power-on reset circuit is connected to the receiving circuit, a first input interface of the receiving circuit is connected to a corresponding first output interface of a transmission circuit via the first signal bus, and a second input interface of the receiving circuit is connected to a corresponding second output interface of the transmission circuit via the second signal bus.

In preferred embodiments, when valid SIPI data received by each of the radio frequency devices contains a clock signal, the radio frequency device includes a second power-on reset circuit and a receiving circuit. The second power-on reset circuit is connected to the receiving circuit, a first input interface of the receiving circuit of the first one of the radio frequency devices is connected to a first output interface of a transmission circuit via the first signal bus, a second input interface of the receiving circuit of the first one of the radio frequency devices is connected to a second output interface of the transmission circuit via the second signal bus, and starting from the first one of the radio frequency devices, the receiving circuits of the radio frequency devices are successively connected via the first signal bus and the second signal bus respectively.

In preferred embodiments, a number of second output interfaces of the transmission circuit and a number of receiving circuits of each of the radio frequency devices are adjusted according to a bit width of the valid SIPI data required by each of the radio frequency devices.

In preferred embodiments, when valid SIPI data received by each of the radio frequency devices does not contain a clock signal, the radio frequency device includes a second power-on reset circuit, a receiving circuit, and a second clock generation circuit. The second power-on reset circuit is connected to the receiving circuit, an output interface of the receiving circuit is connected to an input interface of the second clock generation circuit via one or more clock enable buses, an output interface of the second clock generation circuit is connected to an input interface of the receiving circuit, and when a first input interface of the receiving circuit is connected to a first output interface of a transmission circuit via the first signal bus, a second input interface of the receiving circuit is connected to a second output interface of the transmission circuit via the second signal bus, or the second input interface of the receiving circuit is connected to a corresponding second output interface of the transmission circuit via the second signal bus.

In preferred embodiments, when valid SIPI data received by each of the radio frequency devices does not contain a clock signal, the radio frequency device includes a second power-on reset circuit, a receiving circuit, and a second clock generation circuit. The second power-on reset circuit is connected to the receiving circuit, an output interface of the receiving circuit is connected to an input interface of the second clock generation circuit via one or more clock enable buses, an output interface of the second clock generation circuit is connected to an input interface of the receiving circuit, a first input interface of the receiving circuit is connected to a corresponding first output interface of a transmission circuit via the first signal bus, and a second input interface of the receiving circuit is connected to a corresponding second output interface of the transmission circuit via the second signal bus.

In preferred embodiments, when valid SIPI data received by each of the radio frequency devices does not contain a clock signal, the radio frequency device includes a second power-on reset circuit, a receiving circuit, and a second clock generation circuit. The second power-on reset circuit is connected to the receiving circuit, an output interface of the receiving circuit is connected to an input interface of the second clock generation circuit via one or more clock enable buses, an output interface of the second clock generation circuit is connected to an input interface of the receiving circuit, a first input interface of the receiving circuit of the first one of the radio frequency devices is connected to a first output interface of a transmission circuit via the first signal bus, a second input interface of the receiving circuit of the first one of the radio frequency devices is connected to a second output interface of the transmission circuit via the second signal bus, and starting from the first one of the radio frequency device, the receiving circuits of the radio frequency devices are successively connected via the first signal bus and the second signal bus respectively.

In preferred embodiments, a number of first output interfaces and second output interfaces of the transmission circuit and a number of receiving circuits of each of the radio frequency devices are adjusted according to a bit width of the valid SIPI data required by each of the radio frequency devices.

In preferred embodiments, a number of second output interfaces of the transmission circuit and a number of receiving circuits of each of the radio frequency devices are adjusted according to a bit width of the valid SIPI data required by each of the radio frequency devices.

In preferred embodiments, the receiving circuit includes a second detection circuit configured to extract the valid SIPI data received by the receiving circuit through sampling and decode and configure the valid SIPI data.

According to a fourth aspect of the embodiments of the present invention, a serial communication method is provided, the method including the steps of:

determining, by a radio frequency front-end module, whether latest valid SIPI data is present in a system clock signal and a system data signal received;

enabling generation of a first clock signal in the presence of the latest valid SIPI data; or otherwise receiving the system clock signal and the system data signal again;

extracting, by the radio frequency front-end module, the valid SIPI data from the first clock signal, and transmitting the valid SIPI data to each of radio frequency devices in parallel or in series according to a preset rule; and decoding and configuring the valid SIPI data if the valid SIPI data received by each of the radio frequency devices contains a clock signal; or otherwise enabling generation of a second clock signal, and extracting the valid SIPI data from the second clock signal for decoding and configuration.

According to a fifth aspect of the embodiments of the present invention, a semiconductor device is provided, wherein the semiconductor device includes the above serial communication apparatus.

The serial communication apparatus provided in the present invention detects and extracts valid SIPI data required by each of the radio frequency devices via the radio frequency front-end module, and transmits the valid SIPI data to each of the radio frequency devices quickly and efficiently in a parallel or cascaded serial manner, which not only satisfies requirements for convenient and fast unidirectional communication between and inside various chips of the radio frequency front-end module, but also reduces communication complexity and increases transmission efficiency.

DETAILED DESCRIPTION

Technical contents of the present invention are further described in detail below with reference to the accompanying drawings and specific embodiments.

A serial communication apparatus as provided in the present invention is configured to transmit, to chips of a radio frequency front-end radio frequency module, control information matching the chips, or to satisfy requirements for convenient and fast unidirectional communication between and inside the chips of the radio frequency front-end module. For convenience of description, the inventor refers to the serial communication apparatus as a scalable intra peripheral interface (SIPI). In embodiments of the present invention, the SIPI is used to directly refer to the serial communication apparatus provided in the present invention.

Figure 1:
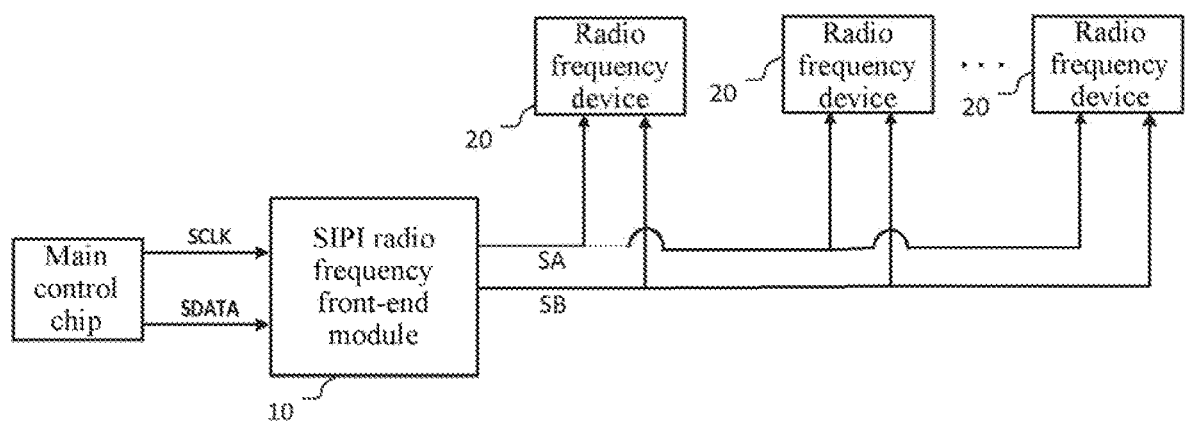
FIG. 1 is schematic circuit diagram 1 of a serial communication apparatus according to the present invention.
Figure 2:
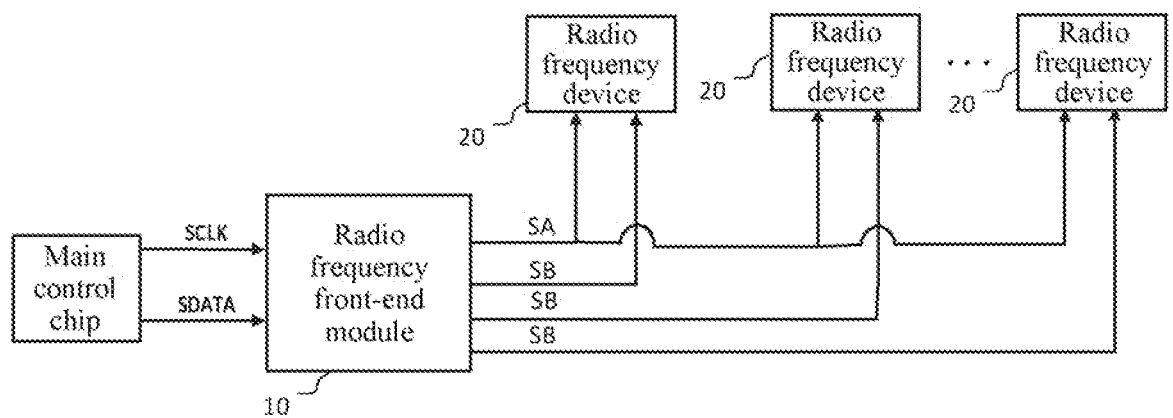
FIG. 2 is schematic circuit diagram 2 of a serial communication apparatus according to the present invention.

As shown in FIG. 1 and FIG. 2, the SIPI includes a radio frequency front-end module 10 and radio frequency devices 20. A first input interface and a second input interface of the radio frequency front-end module 10 are respectively connected to an output interface of a main control module (which may be connected via an existing signal bus). When a first output interface of the radio frequency front-end module 10 is connected to a first input interface of the at least one of the radio frequency devices 20 via a first signal bus SA, a second output interface of the radio frequency front-end module 10 is connected to a second input interface of the at least one of the radio frequency devices 20 via a second signal bus SB. Alternatively, at least one second output interface of the radio frequency front-end module 10 is connected to a second input interface of the at least one of the radio frequency devices 20 via a second signal bus SB.

Figure 3:
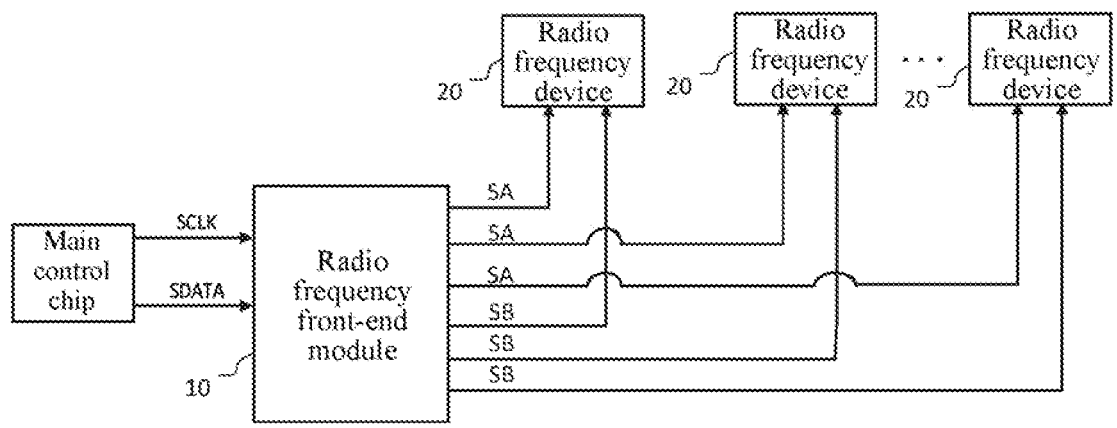
FIG. 3 is schematic circuit diagram 3 of a serial communication apparatus according to the present invention.

As shown in FIG. 3, in the SIPI, alternatively, at least one first input interface of the radio frequency front-end module 10 may be connected to the first input interface of the at least one of the radio frequency devices 20 via the first signal bus SA, and at least one second output interface of the radio frequency front-end module 10 is connected to the second input interface of the at least one of the radio frequency devices 20 via the second signal bus SB. A connection relationship between the first input interface and the second input interface of the radio frequency front-end module 10 is the same as above, and therefore details are not described herein again.

The radio frequency front-end module 10 receives a system clock signal SCLK and a system data signal SDATA transmitted by the main control module, and determines whether latest valid SIPI data (valid control information matching each of the radio frequency devices 20) for each of the radio frequency devices 20 is present; enables generation of a first clock signal in the presence of the latest valid SIPI data for each of the radio frequency devices 20, or otherwise receives the system clock signal SCLK and the system data signal SDATA again; and extracts the valid SIPI data according to the first clock signal through sampling, and transmits the valid SIPI data to each of the radio frequency devices 20 in parallel according to a preset rule, to implement decoding and configuration of the valid SIPI data (configuration of various functions, such as current/voltage adjustment), so that the radio frequency devices 20 update the valid SIPI data synchronously in real time.

Figure 4:
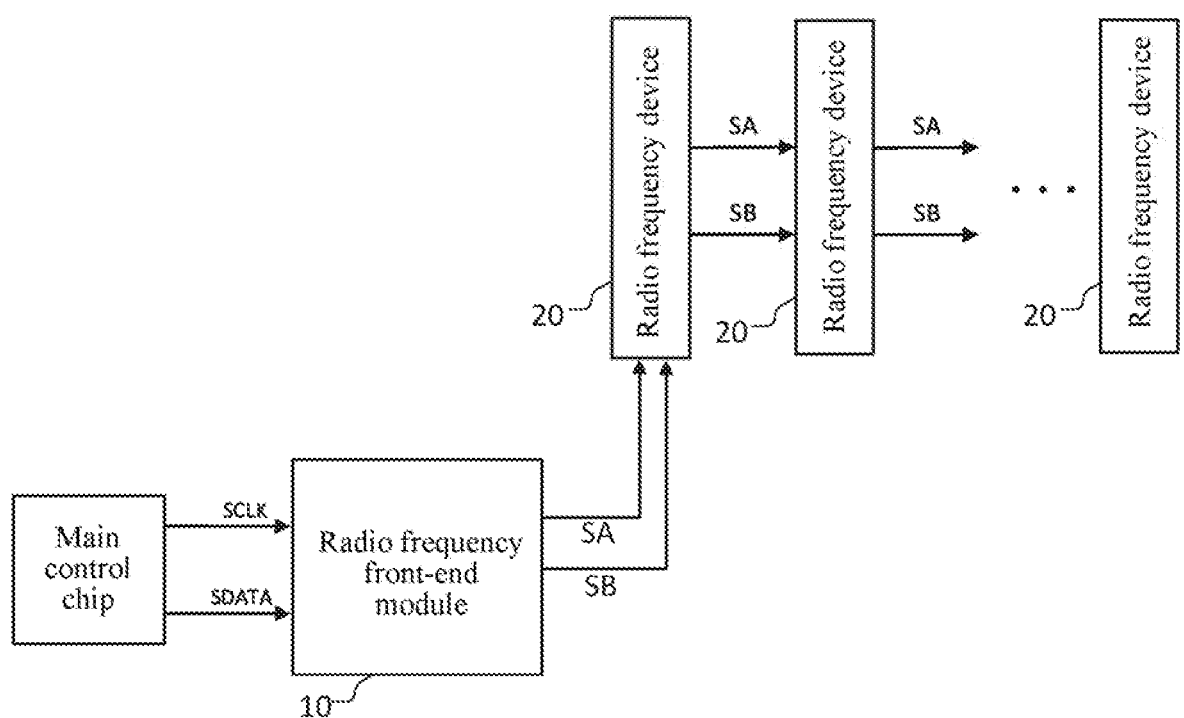
FIG. 4 is schematic circuit diagram 4 of a serial communication apparatus according to the present invention.

As shown in FIG. 4, in the SIPI, alternatively, a first output interface of the radio frequency front-end module 10 may be connected to a first input interface of a first one of the radio frequency device 20 via the first signal bus SA, a second output interface of the radio frequency front-end module 10 is connected to a second input interface of the first radio frequency device 20 via the second signal bus SB, and starting from the first one of the radio frequency device 20, the radio frequency devices 20 are successively connected via the first signal bus SA and the second signal bus SB respectively (that is, adjacent radio frequency devices 20 are connected via the first signal bus SA and the second signal bus SB). A connection relationship between the first input interface and the second input interface of the radio frequency front-end module 10 is the same as above, and therefore details are not described herein again.

The radio frequency front-end module 10 receives a system clock signal SCLK and a system data signal SDATA transmitted by the main control module, and determines whether the latest valid SIPI data (valid control information matching each of the radio frequency devices 20) for each of the radio frequency devices 20 is present; enables generation of a first clock signal in the presence of the latest valid SIPI data for each of the radio frequency devices 20, or otherwise receives the system clock signal SCLK and the system data signal SDATA again; and extracts the valid SIPI data according to the first clock signal through sampling, and transmits the valid SIPI data to the radio frequency devices 20 one by one (in a cascaded serial manner) according to a preset rule, to implement decoding and configuration of the valid SIPI data (configuration of various functions, such as current/voltage adjustment), so that the radio frequency devices 20 successively update the valid SIPI data synchronously in real time.

Figure 13:
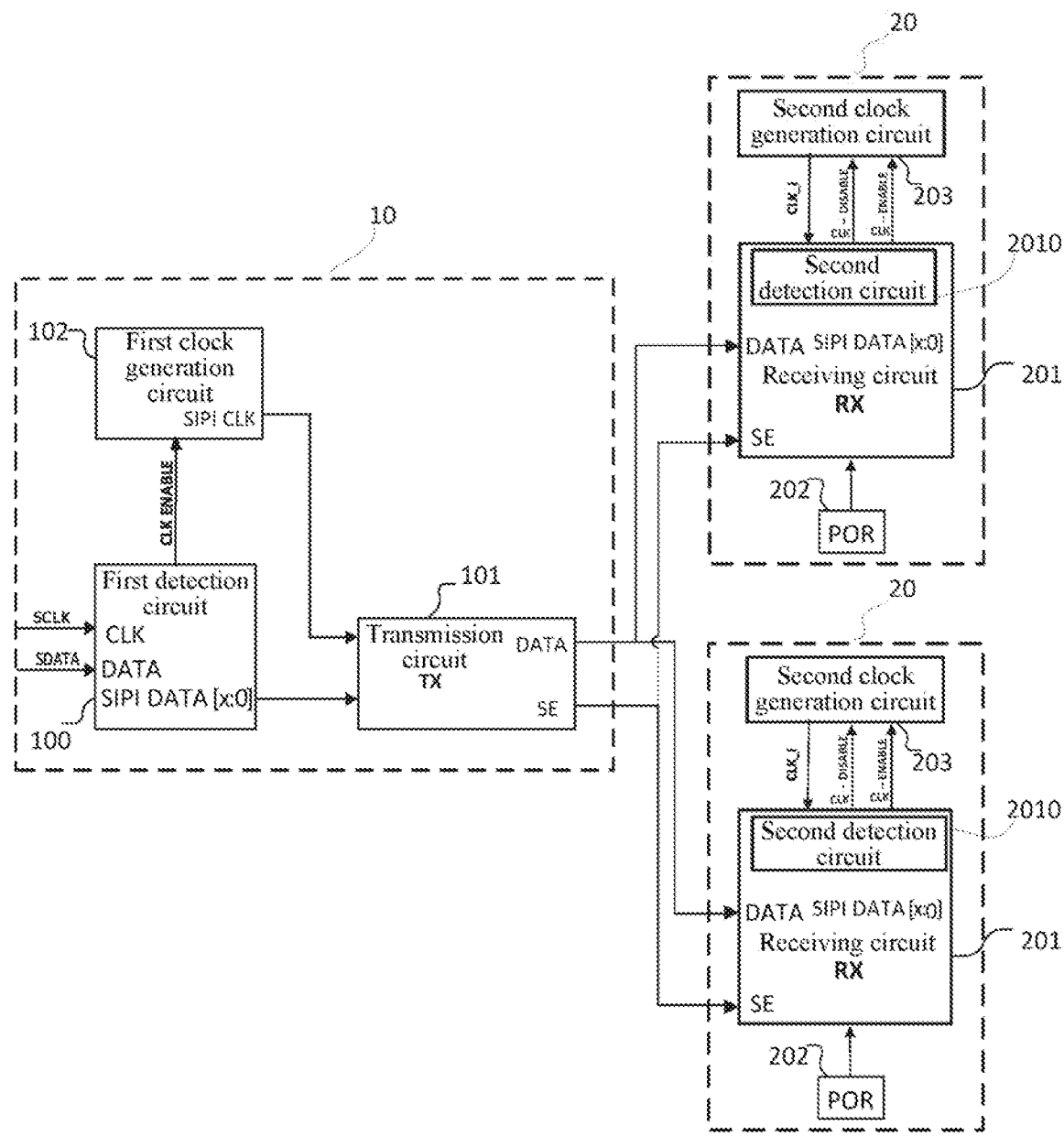
FIG. 13 is schematic circuit diagram 3 of the serial communication apparatus according to Embodiment 3 of the present invention.

A structure and a principle of the SIPI are described in detail below with reference to FIG. 5 and FIG. 13 by way of example that the radio frequency front-end module 10 transmits the latest valid SIP data to each of the radio frequency devices 20 in a parallel mode. A method for implementing unidirectional transmission of the valid SIPI data in a cascaded serial mode is easily obtained according to the method for implementing unidirectional transmission of the valid SIPI data in the parallel mode. In addition, a structure of a radio frequency front-end module 10 and radio frequency devices 20 of the SIPI in the cascaded serial mode is the same as a structure of a radio frequency front-end module 10 and radio frequency devices 20 of the SIPI in the parallel mode, and therefore details are not described herein again.

As shown in FIG. 5 to FIG. 13, in the SIPI, the radio frequency front-end module 10 may include a first detection circuit 100, a first clock generation circuit 102, and a transmission circuit (a transmission circuit TX) 101. A first input interface and a second input interface of the first detection circuit 100 are respectively connected to output interfaces of a main control module (which are connected via an existing signal bus), and the first detection circuit 100 is connected to an input interface of the first clock generation circuit 102 via one or more clock enable buses. An output interface of the first clock generation circuit 102 is connected to a first input interface of the transmission circuit 101 (which are connected via an existing signal bus). An output interface of the first detection circuit 100 is connected to a second input interface of the transmission circuit 101. The main control module may be any main control chip, baseband chip, or the like with a control function. The first input interface and the second input interface of the first detection circuit 100 (that is, the first input interface and the second input interface of the radio frequency front-end module 10) may be any serial communication apparatus, for example, an MIPI interface or a GIPO interface, as long as the interfaces can receive the system clock signal SCLK and the system data signal SDATA transmitted by the main control module.

By means of the first detection circuit 100, the system clock signal SCLK and the system data signal SDATA transmitted by the main control module is received, to determine whether the latest valid SIPI data (the valid control information matching each of the radio frequency devices 20) for each of radio frequency devices 20 is present. In the presence of the latest valid SIPI data DATA_S for each of the radio frequency devices 20, a first clock generation circuit 102 is controlled to generate a first clock signal (an SIPI clock signal) with a specific frequency for a transmission circuit 101 by enabling a clock signal and disabling the clock signal via a clock enable bus, and the latest valid SIPI data DATA_S is transmitted to the transmission circuit 101, so that the transmission circuit 101 extracts the valid SIPI data according to the first clock signal through sampling and then transmits the valid SIPI data to the radio frequency devices 20 according to a preset rule. The preset rule may be encoding, sorting, intercepting, encrypting the valid SIPI data, or the like.

In order to determine whether the transmission circuit 101 of the radio frequency front-end module 10 is in a steady state to ensure accuracy of valid SIPI data DATA_S received by the transmission circuit 101 each time, a first power-on reset (POR) circuit (not shown in the figure) may be disposed in the radio frequency front-end module 10. The first power-on reset circuit is connected to the transmission circuit 101 for generating a reset signal to reset the transmission circuit 101, so that the transmission circuit 101 can receive the valid SIPI data DATA_S after being reset.

When the valid SIPI data received by the radio frequency devices 20 contains a clock signal, each of the radio frequency devices 20 include a second power-on reset (POR) circuit 202 and a receiving circuit (a receiving circuit RX) 201. The second power-on reset circuit 202 is connected to the receiving circuit 201 for generating a reset signal to reset the receiving circuit 201, so that the receiving circuit 201 can receive the valid SIPI data after being reset. When first input interfaces of receiving circuit 201s in all of the radio frequency devices 20 are respectively connected to a first output interface of the transmission circuit 101 via the first signal bus SA, second input interfaces of the receiving circuits 201 in all of the radio frequency devices 20 may be respectively connected to a second output interface of the transmission circuit 101 via the second signal bus SB. Alternatively, the second input interfaces of the receiving circuits 201 in all of the radio frequency devices 20 may be connected to a corresponding second output interface of the transmission circuit 101 via the second signal bus SB. When the first input interfaces of the receiving circuits 201 in all of the radio frequency devices 20 are connected to a corresponding first output interface of the transmission circuit 101 via the first signal bus SA, the second input interfaces of the receiving circuit 201s in all of the radio frequency devices 20 may be respectively connected to the corresponding second output interface of the transmission circuit 101 via the second signal bus SB. The receiving circuit 201 includes a second detection circuit 2010 configured to extract the valid SIPI data received by the receiving circuit 201 through sampling, to decode and configure (configuration of various functions) of the valid SIPI data, so that the radio frequency devices 20 can update the valid SIPI data synchronously in real time.

When the valid SIPI data received by the radio frequency devices 20 does not contain a clock signal, each of the radio frequency devices 20 include a second power-on reset (POR) circuit 202, a receiving circuit (a receiving circuit RX) 201, and a second clock generation circuit 203. The second power-on reset circuit 202 is connected to the receiving circuit 201 and has the same function as above, and therefore details are not described herein again. An output interface of the receiving circuit 201 is connected to an input interface of the second clock generation circuit 203 via one or more clock enable buses, and an output interface of the second clock generation circuit 203 is connected to an input interface of the receiving circuit 201 (which are connected via an existing signal bus). After receiving the valid SIPI data, the receiving circuit 201 controls the second clock generation circuit 203 to generate a second clock signal CLK_i with a specific frequency by enabling and disabling the clock signal via the clock enable bus, and transmits the second clock signal to the receiving circuit 201. When first input interfaces of receiving circuit 201s in all of the radio frequency devices 20 are respectively connected to the first output interface of the transmission circuit 101 via the first signal bus SA, second input interfaces of receiving circuits 201 in all of the radio frequency devices 20 may be respectively connected to the second output interface of the transmission circuit 101 via the second signal bus SB. Alternatively, the second input interfaces of the receiving circuits 201 in all of the radio frequency devices 20 may be respectively connected to the corresponding second output interface of the transmission circuit 101 via the second signal bus SB. When the first input interfaces of the receiving circuits 201 in all of the radio frequency devices 20 are respectively connected to the corresponding first output interface of the transmission circuit 101 via the first signal bus SA, the second input interfaces of the receiving circuits 201 in all of the radio frequency devices 20 may be respectively connected to the corresponding second output interface of the transmission circuit 101 via the second signal bus SB. The receiving circuit 201 includes a second detection circuit 2010 configured to extract according to the second clock signal CLK_i through sampling, the valid SIPI data received by the receiving circuit 201, to decode and configure (configuration of various functions) of the valid SIPI data. The radio frequency device may be a power amplifier chip/module, a radio frequency switch, a radio frequency chip/module, or the like.

The structure and the principle of the above SIPI are described in detail below with reference to FIG. 5 to FIG. 16, using situations in which the radio frequency device 20 including respectively one and two radio frequency devices as examples.

Embodiment 1

Figure 5:
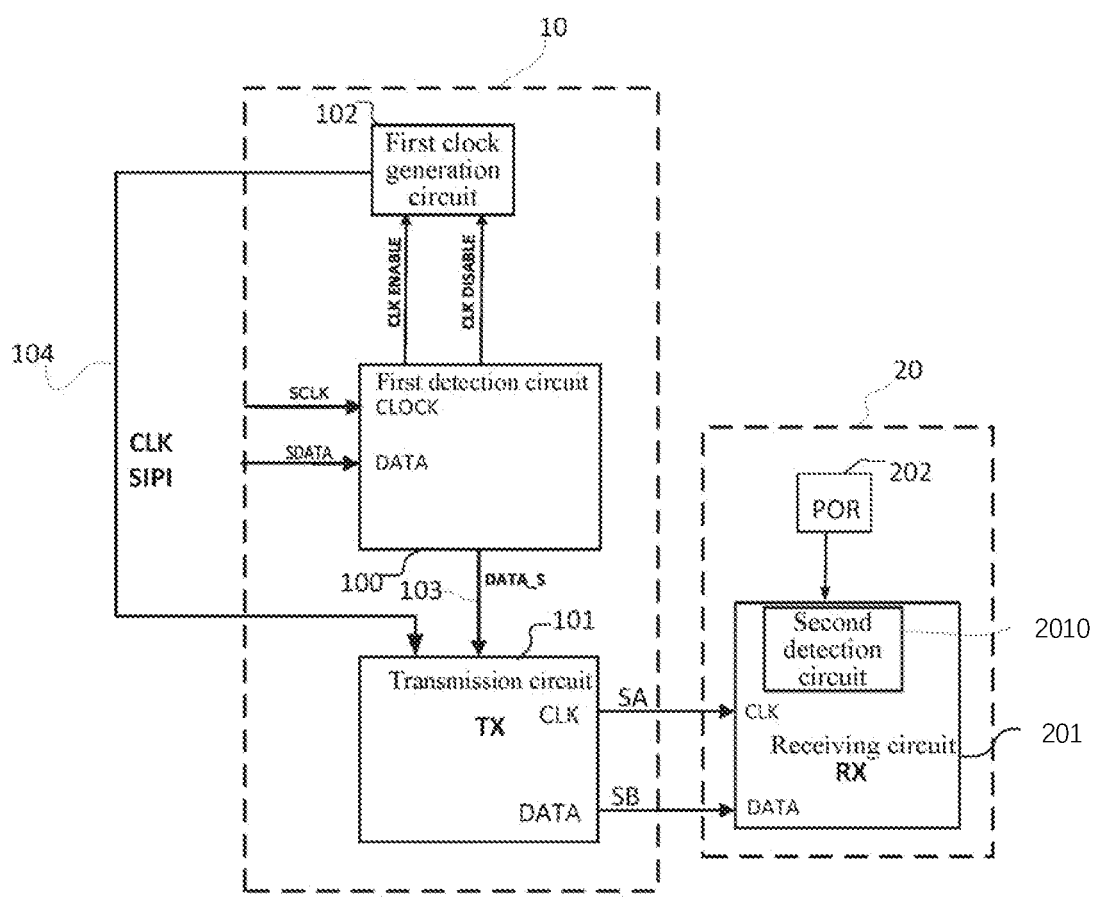
FIG. 5 is schematic circuit diagram 1 of a serial communication apparatus according to Embodiment 1 of the present invention.

As shown in FIG. 5, in the SIPI provided in this embodiment, the radio frequency front-end module 10 may include a first detection circuit 100, a first clock generation circuit 102, and a transmission circuit (a transmission circuit TX) 101. The radio frequency device 20 includes a second power-on reset (POR) circuit 202 and a receiving circuit (an SIPI receiving circuit RX) 201. The receiving circuit 201 includes a second detection circuit 2010. For example, a first input interface and a second input interface of the first detection circuit 100 adopt MIPI interfaces. A connection relationship between parts of the SIPI provided in this embodiment is as follows. A first input interface CLOCK and a second input interface DATA of the first detection circuit 100 are respectively connected to the output interface of the main control module (which are connected via an existing signal bus). The first detection circuit 100 is connected to a corresponding input interface of the first clock generation circuit 102 via a clock enable bus CLK_EN-ABLE and a clock enable bus CLK_DISABLE, an output interface of the first clock generation circuit 102 is connected to a first input interface of the transmission circuit 101 via a signal bus 104, and an output interface of the first detection circuit 100 is connected to a second input interface of the transmission circuit 101 via a signal bus 103. A first output interface CLK of the transmission circuit 101 is connected to a first input interface CLK of the receiving circuit 201 via the first signal bus SA, a second output interface DATA of the transmission circuit 101 is connected to a second input interface DATA of the receiving circuit 201 via the second signal bus SB, and the receiving circuit 201 is connected to the second power-on reset circuit 202.

The second power-on reset circuit 202 generates a reset signal to reset the receiving circuit 201, so that the reset receiving circuit 201 is to receive the valid SIPI data. In this case, by means of the first detection circuit 100, a system clock signal SCLK and a system data signal SDATA transmitted by the main control module are received, and the received system clock signal SCLK and system data signal SDATA are detected and decoded in real time, and it may be determined whether the latest valid SIPI data (the valid control information matching each of the radio frequency devices 20) for the radio frequency device 20 exits through address information pre-stored in the first detection circuit 100 matching the radio frequency device 20. In the presence of the latest valid SIPI data DATA_S for the radio frequency device 20, the clock signal is enabled and the clock signal is disabled respectively through the clock enable bus CLK_ENABLE and the clock enable bus CLK_DISABLE to control the first clock generation circuit 102 to generate a first clock signal (an SIPI clock signal) with a specific frequency for the transmission circuit 101, and the latest valid SIPI data DATA_S is transmitted to the transmission circuit 101, so that the transmission circuit 101 extracts the valid SIPI data according to the first clock signal through sampling and then transmits the valid SIPI data to the receiving circuit 201 through encoding, sorting, interception, encryption, or the like. The valid SIPI data received by the receiving circuit 201 includes a clock signal and a data signal. Therefore, the first signal bus SA may be a clock bus for transmitting the clock signal, and the second signal bus SB may be a data bus for transmitting the data signal. In addition, valid SIPI data is extracted through sampling by the second detection circuit 2010 from the clock signal and the data signal received by the receiving circuit 201, and the valid SIPI data is decoded and configured (configuration of various functions), so that the radio frequency device 20 updates the valid SIPI data synchronously in real time. The second detection circuit 2010 may further determine whether the received clock signal and data signal match the current radio frequency device.

When a bit width of valid SIPI data required by the radio frequency device 20 in this embodiment is relatively large, the valid SIPI data required by the radio frequency device 20 may be split into a plurality of pieces of data, and the plurality of pieces of valid SIPI data are respectively received through a plurality of receiving circuits 201. In other words, a number of second output interfaces DATA of the transmission circuit 101 and a number of receiving circuits 201 are correspondingly increased. A plurality of second output interfaces DATA of the transmission circuit 101 are connected to corresponding second input interfaces DATA of the receiving circuits 201 via corresponding second signal buses SB, so that the plurality of pieces of valid SIPI data (the plurality of pieces of split valid SIPI data) are correspondingly transmitted to the plurality of receiving circuits 201 of the radio frequency device 20 efficiently and quickly via the plurality of second output interfaces DATA of the transmission circuit 101. The corresponding valid SIPI data is extracted through sampling by second detection circuits 2010 of the receiving circuits 201, and the extracted valid SIPI data is decoded and configured (configuration of various functions), thus enabling each of the radio frequency devices 20 to update the valid SIPI data synchronously in real time. It is to be emphasized that each of the receiving circuits 201 needs to be connected to the second power-on reset circuit 202. The second power-on reset circuit 202 generates a reset signal to reset each of the receiving circuits 201, so that the reset receiving circuit 201 is to receive valid SIPI data.

Figure 6:
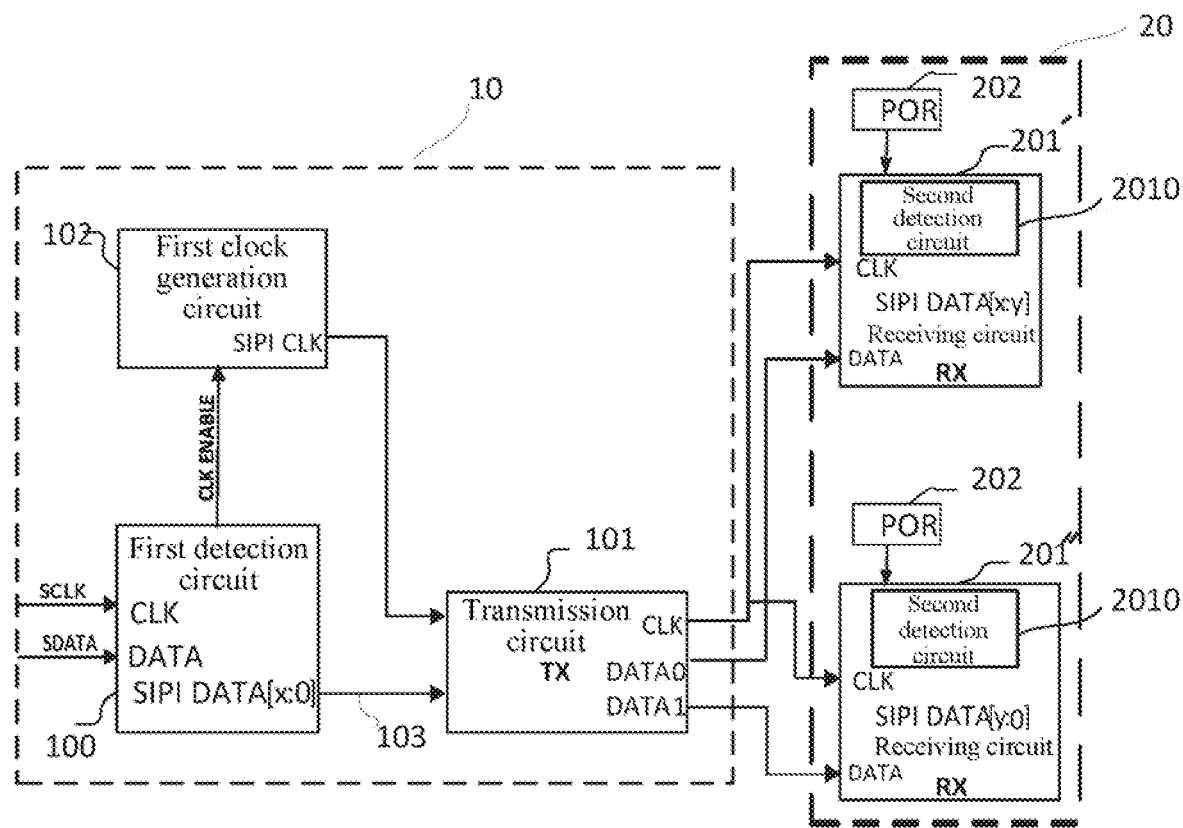
FIG. 6 is schematic circuit diagram 2 of the serial communication apparatus according to Embodiment 1 of the present invention.

For example, as shown in FIG. 6, assuming that valid SIPI data DATA[x:0] required by the radio frequency device 20 is split into valid SIPI data DATA[x:y] and valid SIPI data DATA[y:0], the number of second output interfaces of the transmission circuit 101 and the number of receiving circuits are respectively increased to two, that is, the second output interfaces of the transmission circuit 1011 are a second output interface DATA0 and a second output interface DATA1, and the receiving circuits are a receiving circuit 201' and a receiving circuit 201". The second output interface DATA0 is connected to a second input interface DATA of the receiving circuit 201' via the second signal bus SB, and the second output interface DATA1 is connected to a second input interface DATA of the receiving circuit 201" via the second signal bus SB. The first output interface CLK of the transmission circuit 101 is connected to first input interfaces CLK of the receiving circuit 201' and the receiving circuit 201" via the first signal bus SA.

The second power-on reset circuit 202 generates reset signals to respectively reset the receiving circuit 201' and the receiving circuit 201", so that the reset receiving circuit 201' and the receiving circuit 201" are to receive valid SIPI data. In this case, by means of the first detection circuit 100, the system clock signal SCLK and the system data signal SDATA transmitted by the main control module is received, and the received system clock signal SCLK and system data signal SDATA are detected and decoded in real time, and it may be determined whether the latest valid SIPI data DATA [x:0] for the radio frequency device 20 is present through address information pre-stored in the first detection circuit 100 matching the radio frequency device 20. In the presence of the latest valid SIPI data DATA[x:0] for the radio frequency device 20, the clock signal may be enabled and the clock signal may be disabled correspondingly through the clock enable bus CLK_ENABLE to control the first clock generation circuit 102 to generate a first clock signal (an SIPI clock signal) with a specific frequency for the transmission circuit 101, and the latest valid SIPI data DATA[x:0] is transmitted to the transmission circuit 101, so that the transmission circuit 101 extracts the valid SIPI data DATA [x:y] and the valid SIPI data DATA[y:0] according to the first clock signal through sampling, and then correspondingly transmits the valid SIPI data DATA[x:y] and the valid SIPI data DATA[y:0] to the receiving circuit 201' and the receiving circuit 201" through encoding, sorting, interception, encryption, or the like. The corresponding valid SIPI data is extracted through sampling by the second detection circuits 2010 of the receiving circuits, to decode and configure the extracted valid SIPI data (configuration of various functions), so that the radio frequency device 20 updates the valid SIPI data synchronously in real time.

When the bit width of the valid SIPI data required by the radio frequency device 20 in this embodiment is not large, the valid SIPI data may be sent to each of the radio frequency devices 20 through the first output interface and the second output interface of the transmission circuit 101.

In other words, the first input interfaces of the receiving circuits 201 in all of the radio frequency devices 20 are respectively connected to the first output interface of the transmission circuit 101 via the first signal bus SA, and the second input interfaces of the receiving circuits 201 in all of the radio frequency devices 20 may be respectively connected to the second output interface of the transmission circuit 101 via the second signal bus SB.

Figure 7:
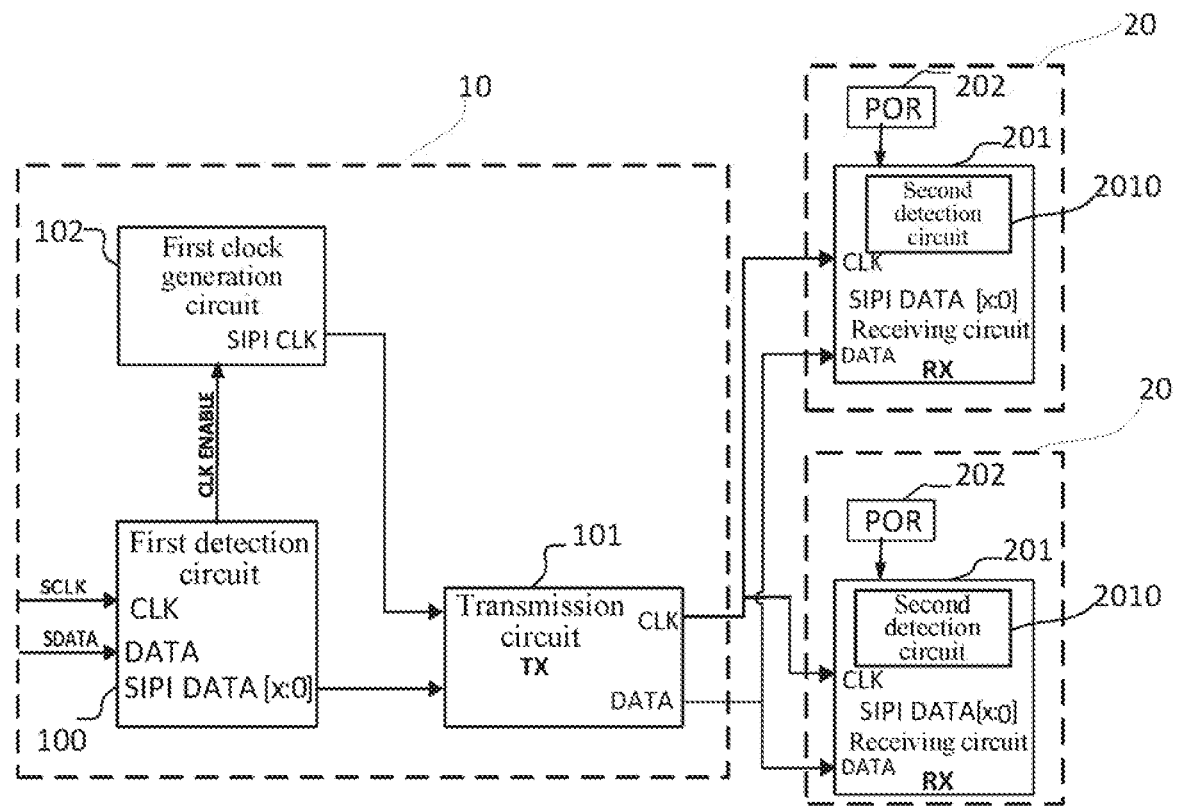
FIG. 7 is a schematic circuit diagram 3 of the serial communication apparatus according to Embodiment 1 of the present invention.

For example, as shown in FIG. 7, assuming that all valid SIPI data required by all of radio frequency devices 20 is DATA[x:0], the second power-on reset circuit 202 generates reset signals to respectively reset the receiving circuits 201, so that the reset receiving circuits 201 are to receive the valid SIPI data. In this case, by means of the first detection circuit 100, the system clock signal SCLK and the system data signal SDATA transmitted by the main control module are received, and the received system clock signal SCLK and system data signal SDATA are detected and decoded in real time, and it may be determined whether the latest valid SIPI data DATA[x:0] for the radio frequency device 20 is present through address information pre-stored in the first detection circuit 100 matching the radio frequency device 20. In the presence of the latest valid SIPI data DATA[x:0] for the radio frequency device 20, the clock signal is enabled and the clock signal is disabled correspondingly through the clock enable bus CLK_ENABLE to control the first clock generation circuit 102 to generate a first clock signal (an SIPI clock signal) with a specific frequency for the transmission circuit 101, and the latest valid SIPI data DATA[x:0] is transmitted to the transmission circuit 101, so that the transmission circuit 101 extracts the valid SIPI data DATA [x:0] according to the first clock signal through sampling, and then correspondingly transmits the valid SIPI data DATA[x:0] to the receiving circuits 201 through encoding, sorting, interception, encryption, or the like. The corresponding valid SIPI data DATA[x:0] is extracted through sampling by the second detection circuits 2010 of the receiving circuits, to decode and configure the extracted valid SIPI data[x:0] (configuration of various functions), so that the radio frequency device 20 updates the valid SIPI data synchronously in real time, which greatly simplifies complexity of serial communication apparatuses of all of the radio frequency devices 20 (the first input interfaces and the second input interfaces of all of the radio frequency devices). The valid SIPI data required by all of the radio frequency devices 20 may be randomly distributed in entire valid SIPI data in series.

Embodiment 2

Figure 8:
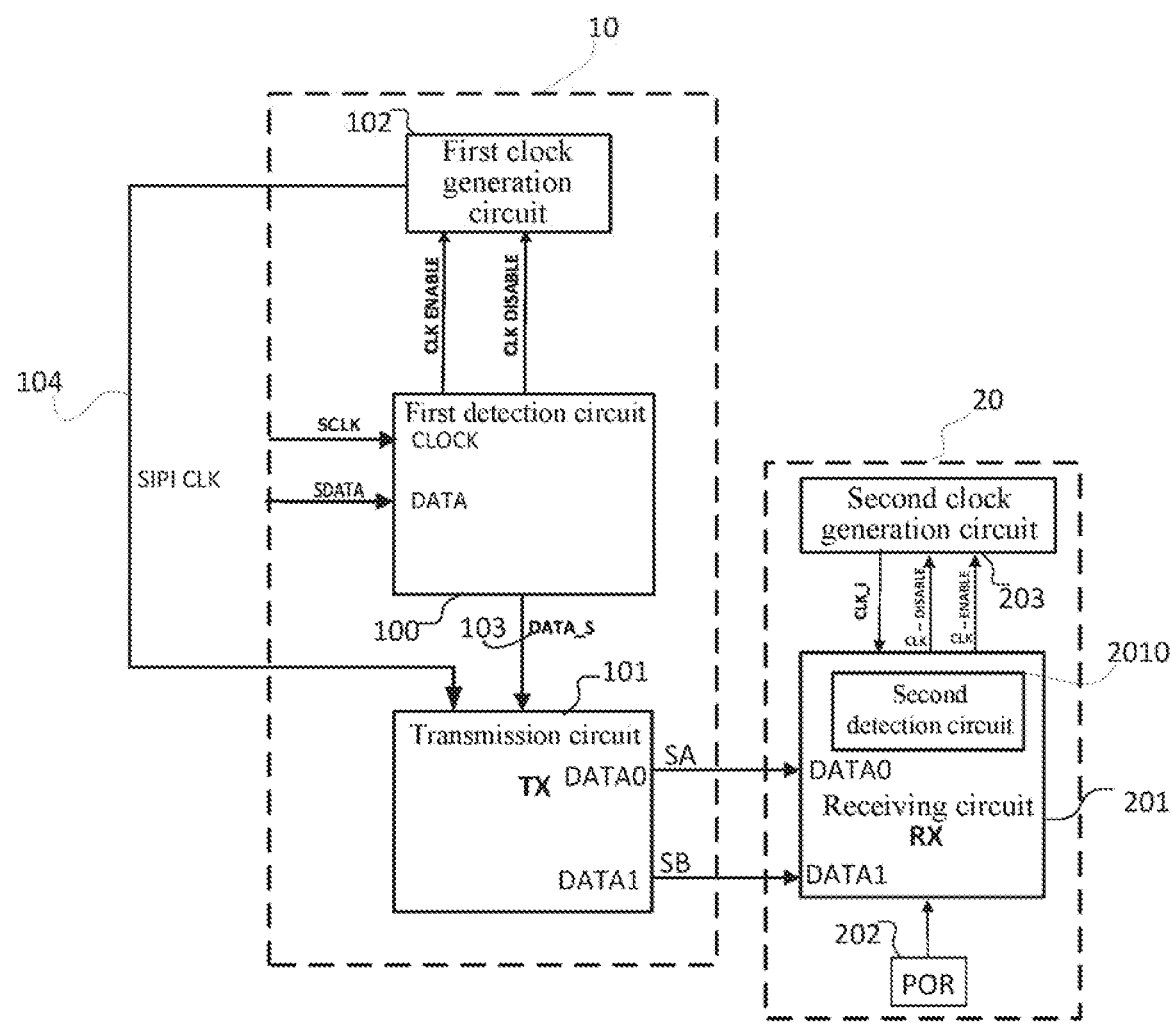
FIG. 8 is schematic circuit diagram 1 of a serial communication apparatus according to Embodiment 2 of the present invention.

As shown in FIG. 8, in the SIPI provided in this embodiment, the radio frequency front-end module 10 may include a first detection circuit 100, a first clock generation circuit 102, and a transmission circuit (an SIPI transmission circuit TX) 101. The radio frequency device 20 includes a second power-on reset (POR) circuit 202, a receiving circuit (an SIPI receiving circuit RX) 201, and a second clock generation circuit 203. The receiving circuit 201 includes a second detection circuit 2010. For example, a first input interface and a second input interface of the first detection circuit 100 adopt MIPI interfaces. A connection relationship between parts of the SIPI provided in this embodiment is as follows. A first input interface CLOCK and a second input interface DATA of the first detection circuit 100 are correspondingly connected to the output interface of the main control module (which are connected via an existing signal bus). The first detection circuit 100 is connected to a corresponding input interface of the first clock generation circuit 102 via a clock enable bus CLK_ENABLE and a clock enable bus CLK_DISABLE, an output interface of the first clock generation circuit 102 is connected to a first input interface of the transmission circuit 101 via the signal bus 104, and an output interface of the first detection circuit 100 is connected to a second input interface of the transmission circuit 101 via the signal bus 103. A first output interface DATA0 of the transmission circuit 101 is connected to a first input interface DATA0 of the receiving circuit 201 via the first signal bus SA, a second output interface DATA1 of the transmission circuit 101 is connected to a second input interface DATA1 of the receiving circuit 201 via the second signal bus SB, and the receiving circuit 201 is connected to the second power-on reset circuit 202.

The second power-on reset circuit 202 generates a reset signal to reset the receiving circuit 201, so that the reset receiving circuit 201 is to receive the valid SIPI data. In this case, by means of the first detection circuit 100, a system clock signal SCLK and a system data signal SDATA transmitted by the main control module are received, and the received system clock signal SCLK and system data signal SDATA are detected and decoded in real time, and it may be determined whether latest valid SIPI data (valid control information matching each of the radio frequency devices 20) for the radio frequency device 20 exits through address information pre-stored in the first detection circuit 100 matching the radio frequency device 20. In the presence of the latest valid SIPI data DATA_S for the radio frequency device 20, the first clock generation circuit 102 is controlled to generate a first clock signal (an SIPI clock signal) with a specific frequency for the transmission circuit 101 by enabling the clock signal and disabling the clock signal correspondingly through the clock enable bus CLK_ENABLE and the clock enable bus CLK_DISABLE, and the latest valid SIPI data DATA_S is transmitted to the transmission circuit 101, so that the transmission circuit 101 extracts the valid SIPI data according to the first clock signal through sampling and then transmits the valid SIPI data to the receiving circuit 201 through encoding, sorting, interception, encryption, or the like. The valid SIPI data received by the receiving circuit 201 includes only a data signal. Therefore, the first signal bus SA may be a first data bus for transmitting the data signal, and the second signal bus SB may be a second data bus also for transmitting the data signal. In addition, the valid SIPI data can be sampled from the data signal transmitted via the first data bus and the data signal transmitted via the second data bus. Since the valid SIPI data includes a data frame header signal, a data signal, and a data frame tail signal, the receiving circuit 201 may control, according to the received data frame header signal or data frame tail signal of the valid SIPI data, the second clock generation circuit 203 to generate a second clock signal CLK_i (an SIPI clock signal) with a specific frequency for the receiving circuit 201 by enabling the clock signal and disabling the clock signal correspondingly through the clock enable bus CLK_ENABLE and the clock enable bus CLK_DISABLE, so that the second detection circuit 2010 extracts the valid SIPI data according to the second clock signal through sampling, and then decodes and configures the valid SIPI data (configuration of various functions), thus enabling the radio frequency device 20 to update the valid SIPI data synchronously in real time. The second detection circuit 2010 may further determine whether the received data signal matches the current radio frequency device. The data frame header signal and the data frame tail signal are respectively used to determine positions of a start bit and a stop bit of the valid SIPI data.

Figure 9:
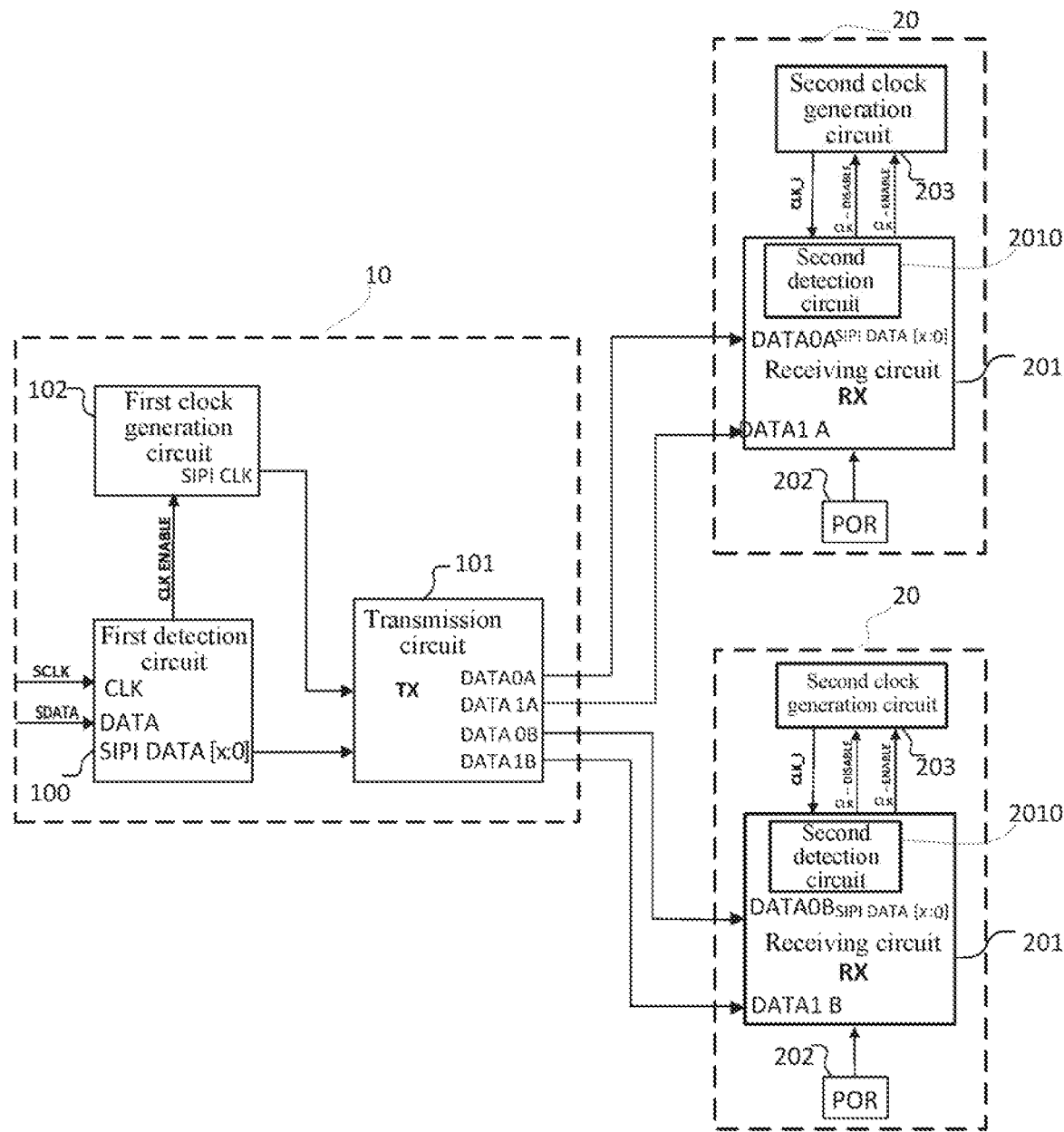
FIG. 9 is schematic circuit diagram 2 of the serial communication apparatus according to Embodiment 2 of the present invention.

As shown in FIG. 9, assuming that all of the valid SIPI data required by all of the radio frequency devices 20 is data[x:0], the second power-on reset circuit 202 generates reset signals to respectively reset the receiving circuits 201, so that the reset receiving circuits 201 are to receive valid SIPI data. In this case, by means of the first detection circuit 100, a system clock signal SCLK and a system data signal SDATA transmitted by the main control module are received, and the received system clock signal SCLK and system data signal SDATA are detected and decoded in real time, and it may be determined whether latest valid SIPI data DATA[x:0] for the radio frequency device 20 is present through address information pre-stored in the first detection circuit 100 matching the radio frequency device 20. In the presence of the latest valid SIPI data DATA[x:0] for the radio frequency device 20, the first clock generation circuit 102 is controlled to generate a first clock signal (an SIPI clock signal) with a specific frequency for the transmission circuit 101 by enabling the clock signal and disabling the clock signal correspondingly through the clock enable bus CLK_ENABLE, and the latest valid SIPI data DATA[x:0] is transmitted to the transmission circuit 101, so that the transmission circuit 101 extracts the valid SIPI data DATA[x:0] according to the first clock signal through sampling and then transmits the valid SIPI data to DATA[x:0] to the receiving circuits 201 via two sets of data buses (a first data bus DATA0A and a second data bus DATA1A, and a first data bus DATA0B and a second data bus DATA1B) respectively through encoding, sorting, interception, encryption, or the like. Each of the receiving circuits 201 may control, according to a received data frame header signal or data frame tail signal of the valid SIPI data, the second clock generation circuit 203 to generate a second clock signal CLK_i (an SIPI clock signal) with a specific frequency for the receiving circuit 201 by enabling the clock signal and disabling the clock signal correspondingly through the clock enable bus CLK_ENABLE and the clock enable bus CLK_DISABLE, so that the second detection circuit 2010 extracts the valid SIPI data according to the second clock signal through sampling, and then decodes and configures the valid SIPI data (configuration of various functions), thus enabling each of the radio frequency devices 20 to update the valid SIPI data synchronously in real time. In this case, use efficiency and transmission efficiency of the valid SIPI data may be higher, and more valid control information is transmitted.

Figure 10:
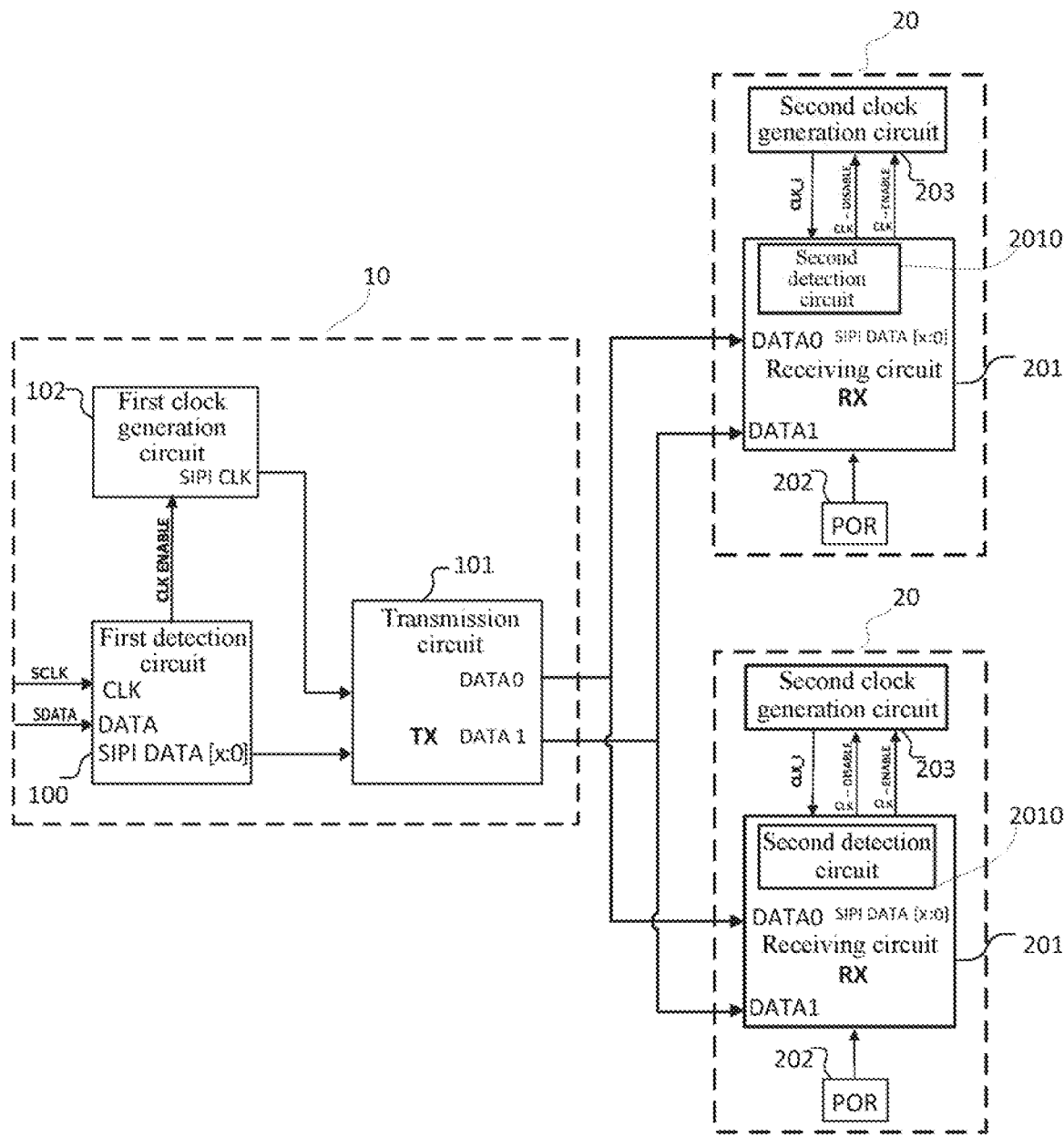
FIG. 10 is schematic circuit diagram 3 of the serial communication apparatus according to Embodiment 2 of the present invention.

In addition, in order to simplify complexity of the communication between the radio frequency front-end module 10 and the radio frequency devices 20 and to transmit more valid SIPI data to the radio frequency devices at higher transmission efficiency, the transmission circuit 101 may adopt a unified dual output interface (a first output interface and a second output interface). For example, as shown in FIG. 10, assuming that all valid SIPI data required by all of radio frequency devices 20 is data[x:0], the second power-on reset circuit 202 generates reset signals to respectively reset the receiving circuits 201, so that the reset receiving circuits 201 are to receive the valid SIPI data. In this case, by means of the first detection circuit 100, the system clock signal SCLK and the system data signal SDATA transmitted by the main control module is received, and the received system clock signal SCLK and system data signal SDATA are detected and decoded in real time, and it may be determined whether the latest valid SIPI data DATA[x:0] for the radio frequency device 20 is present through address information pre-stored in the first detection circuit 100 matching the radio frequency device 20. In the presence of the latest valid SIPI data DATA[x:0] for the radio frequency device 20, the first clock generation circuit 102 is controlled to generate a first clock signal (an SIPI clock signal) with a specific frequency for the transmission circuit 101 by enabling the clock signal and disabling the clock signal correspondingly through the clock enable bus CLK_ENABLE, and the latest valid SIPI data DATA[x:0] is transmitted to the transmission circuit 101, so that the transmission circuit 101 extracts the valid SIPI data DATA[x:0] according to the first clock signal through sampling and then transmits the valid SIPI data to DATA[x:0] to the receiving circuits 201 via a first output interface DATA0 and a second output interface DATA1 respectively through encoding, sorting, interception, encryption, or the like. Each of the receiving circuits 201 may control, according to a received data frame header signal or data frame tail signal of the valid SIPI data, the second clock generation circuit 203 to generate a second clock signal CLK_i (an SIPI clock signal) with a specific frequency for the receiving circuit 201 by enabling the clock signal and disabling the clock signal correspondingly through the clock enable bus CLK_ENABLE and the clock enable bus CLK_DISABLE, so that the second detection circuit 2010 extracts the valid SIPI data according to the second clock signal through sampling, and then decodes and configures the valid SIPI data (configuration of various functions), thus enabling each of the radio frequency devices 20 to update the valid SIPI data synchronously in real time.

When a bit width of valid SIPI data required by the radio frequency device 20 in this embodiment is relatively large, the valid SIPI data required by the radio frequency device 20 may be split into a plurality of pieces of data, and the plurality of pieces of valid SIPI data are respectively received through a plurality of receiving circuits 201. In other words, a number of first output interfaces DATA0 and second output interfaces DATA1 of the transmission circuit 101 and a number of receiving circuits 201 are correspondingly increased. A plurality of first output interfaces DATA0 of the transmission circuit 101 are connected to corresponding first input interfaces DATA0 of the receiving circuits 201 via corresponding first signal buses SA, and a plurality of second output interfaces DATA1 of the transmission circuit 101 are connected to corresponding second input interfaces DATA1 of the receiving circuits 201 via corresponding second signal buses SB, so that a plurality of pieces of valid SIPI data (a plurality of pieces of split valid SIPI data) is correspondingly transmitted to the plurality of receiving circuits 201 of the radio frequency device 20 efficiently and quickly via the plurality of first output interfaces DATA0 and second output interfaces DATA1 of the transmission circuit 101. Each of the receiving circuits 201 may control, according to a received data frame header signal or data frame tail signal of the valid SIPI data, the second clock generation circuit 203 to generate a second clock signal CLK_i (an SIPI clock signal) with a specific frequency for the receiving circuit 201 by enabling the clock signal and disabling the clock signal correspondingly through the clock enable bus CLK_ENABLE and the clock enable bus CLK_DISABLE, so that the second detection circuit 2010 extracts the valid SIPI data according to the second clock signal through sampling, and then decodes and configures the valid SIPI data (configuration of various functions), thus enabling each of the radio frequency devices 20 to update the valid SIPI data synchronously in real time. It is to be emphasized that each of the receiving circuits 201 needs to be connected to the second power-on reset circuit 202. The second power-on reset circuit 202 generates a reset signal to reset each of the receiving circuits 201, so that the reset receiving circuit 201 is to receive valid SIPI data.

Embodiment 3

Figure 11:
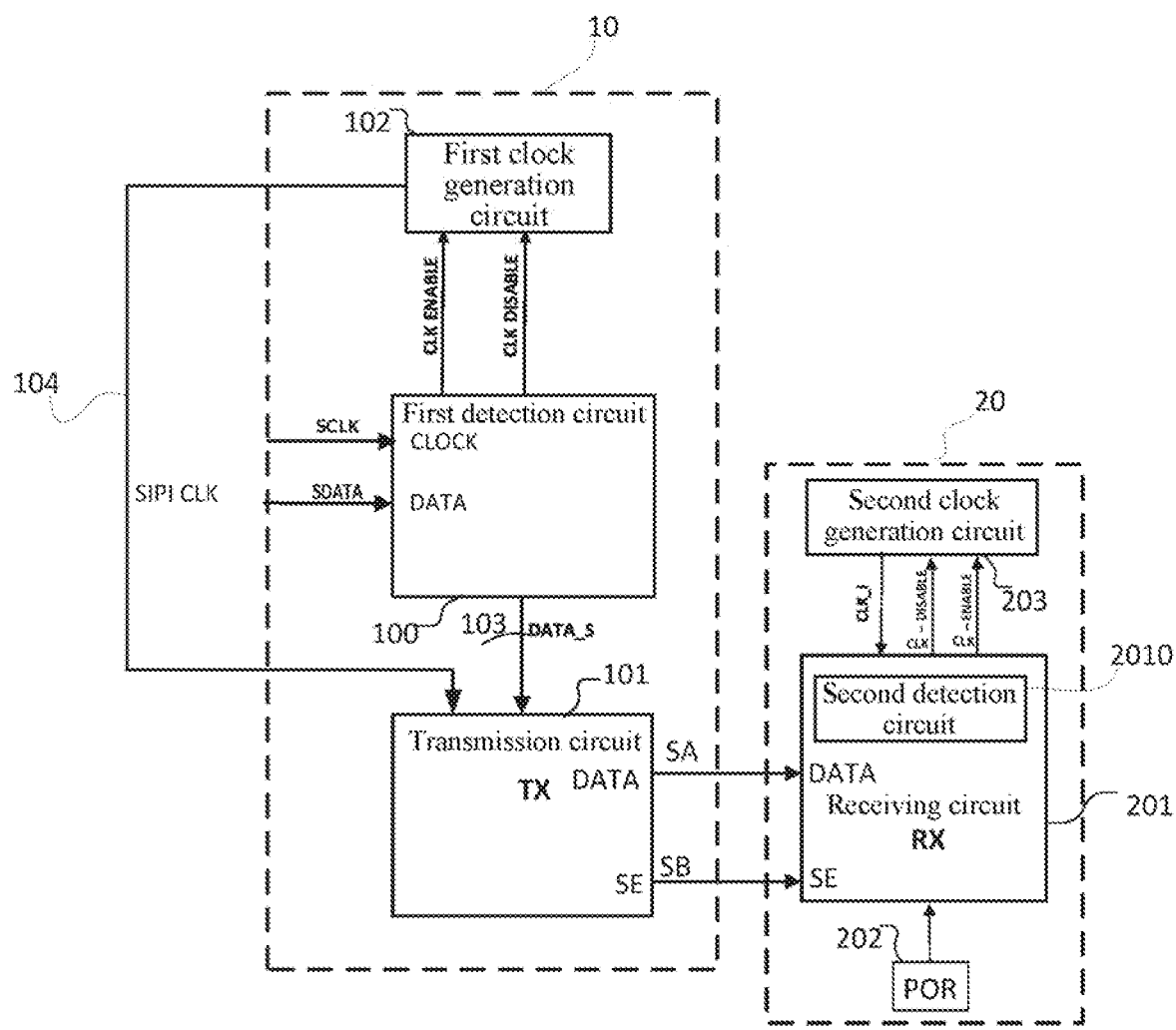
FIG. 11 is schematic circuit diagram 1 of a serial communication apparatus according to Embodiment 3 of the present invention.

As shown in FIG. 11, in the SIPI provided in this embodiment, the radio frequency front-end module 10 may include a first detection circuit 100, a first clock generation circuit 102, and a transmission circuit (a transmission circuit TX) 101. The radio frequency device 20 includes a second power-on reset (POR) circuit 202, a receiving circuit (an SIPI receiving circuit RX) 201, and a second clock generation circuit 203. The receiving circuit 201 includes a second detection circuit 2010. For example, a first input interface and a second input interface of the first detection circuit 100 adopt MIPI interfaces. A connection relationship between parts of the SIPI provided in this embodiment is as follows. A first input interface CLOCK and a second input interface DATA of the first detection circuit 100 are correspondingly connected to the output interface of the main control module (which are connected via an existing signal bus). The first detection circuit 100 is connected to a corresponding input interface of the first clock generation circuit 102 via the clock enable bus CLK_ENABLE and the clock enable bus CLK_DISABLE, an output interface of the first clock generation circuit 102 is connected to a first input interface of the transmission circuit 101 via the signal bus 104, and an output interface of the first detection circuit 100 is connected to a second input interface of the transmission circuit 101 via the signal bus 103. A first output interface DATA of the transmission circuit 101 is connected to a first input interface DATA of the receiving circuit 201 via the first signal bus SA, a second output interface SE of the transmission circuit 101 is connected to a second input interface SE of the receiving circuit 201 via the second signal bus SB, and the receiving circuit 201 is connected to the second power-on reset circuit 202.

The second power-on reset circuit 202 generates a reset signal to reset the receiving circuit 201, so that the reset receiving circuit 201 is to receive the valid SIPI data. In this case, by means of the first detection circuit 100, a system clock signal SCLK and a system data signal SDATA transmitted by the main control module are received, and the received system clock signal SCLK and system data signal SDATA are detected and decoded in real time, and it may be determined whether latest valid SIPI data (valid control information matching each of the radio frequency devices 20) for the radio frequency device 20 is present through address information pre-stored in the first detection circuit 100 matching the radio frequency device 20. In the presence of the latest valid SIPI data DATA_S for the radio frequency device 20, the first clock generation circuit 102 is controlled to generate a first clock signal (an SIPI clock signal) with a specific frequency for the transmission circuit 101 by enabling the clock signal and disabling the clock signal correspondingly through the clock enable bus CLK_ENABLE and the clock enable bus CLK_DISABLE, and the latest valid SIPI data DATA_S is transmitted to the transmission circuit 101, so that the transmission circuit 101 extracts the valid SIPI data according to the first clock signal through sampling and then transmits the valid SIPI data to the receiving circuit 201 through encoding, sorting, interception, encryption, or the like. The valid SIPI data received by the receiving circuit 201 includes a data signal and an enable signal. Therefore, the first signal bus SA may be a data bus for transmitting the data signal, and the second signal bus SB may be an enable bus for transmitting the enable signal. In addition, the valid SIPI data can be sampled from the data signal transmitted via the data bus and the enable signal transmitted via the enable bus. Since the valid SIPI data includes a data frame header signal, a data signal, and a data frame tail signal, the receiving circuit 201 may control, according to the received data frame header signal or data frame tail signal of the valid SIPI data, the second clock generation circuit 203 to generate a second clock signal CLK_i (an SIPI clock signal) with a specific frequency for the receiving circuit 201 by enabling the clock signal and disabling the clock signal correspondingly through the clock enable bus CLK_ENABLE and the clock enable bus CLK_DISABLE, so that the second detection circuit 2010 extracts the valid SIPI data according to the second clock signal through sampling, and then decodes and configures the valid SIPI data (configuration of various functions), thus enabling the radio frequency device 20 to update the valid SIPI data synchronously in real time. The second detection circuit 2010 may further determine whether the received data signal matches the current radio frequency device. The data frame header signal and the data frame tail signal are respectively used to determine positions of a start bit and a stop bit of the valid SIPI data.

When a bit width of valid SIPI data required by the radio frequency device 20 in this embodiment is relatively large, the valid SIPI data required by the radio frequency device 20 may be split into a plurality of pieces of data, and the plurality of pieces of valid SIPI data are respectively received through a plurality of receiving circuits 201. In other words, a number of second output interfaces SE of the transmission circuit 101 and a number of receiving circuits 201 are correspondingly increased. A plurality of second output interfaces SE of the transmission circuit 101 are connected to corresponding second input interfaces SE of the receiving circuits 201 via corresponding second signal buses SB, so that a plurality of pieces of valid SIPI data (a plurality of pieces of split valid SIPI data) can be respectively transmitted to the plurality of receiving circuits 201 of the radio frequency devices 20 efficiently and quickly via a plurality of second output interfaces SE of the transmission circuit 101. Each of the receiving circuits 201 may control, according to a received data frame header signal or data frame tail signal of the valid SIPI data, the second clock generation circuit 203 to generate a second clock signal CLK_i (an SIPI clock signal) with a specific frequency for the receiving circuit 201 by respectively enabling the clock signal and disabling the clock signal through the clock enable bus CLK_ENABLE and the clock enable bus CLK_DISABLE, so that the second detection circuit 2010 extracts the valid SIPI data according to the second clock signal through sampling and then decodes and configures the valid SIPI data (configuration of various functions), thus enabling the radio frequency device 20 to update the valid SIPI data synchronously in real time. It is to be emphasized that each of the receiving circuits 201 needs to be connected to the second power-on reset circuit 202. The second power-on reset circuit 202 generates a reset signal to reset each of the receiving circuits 201, so that the reset receiving circuit 201 is to receive valid SIPI data.

Figure 12:
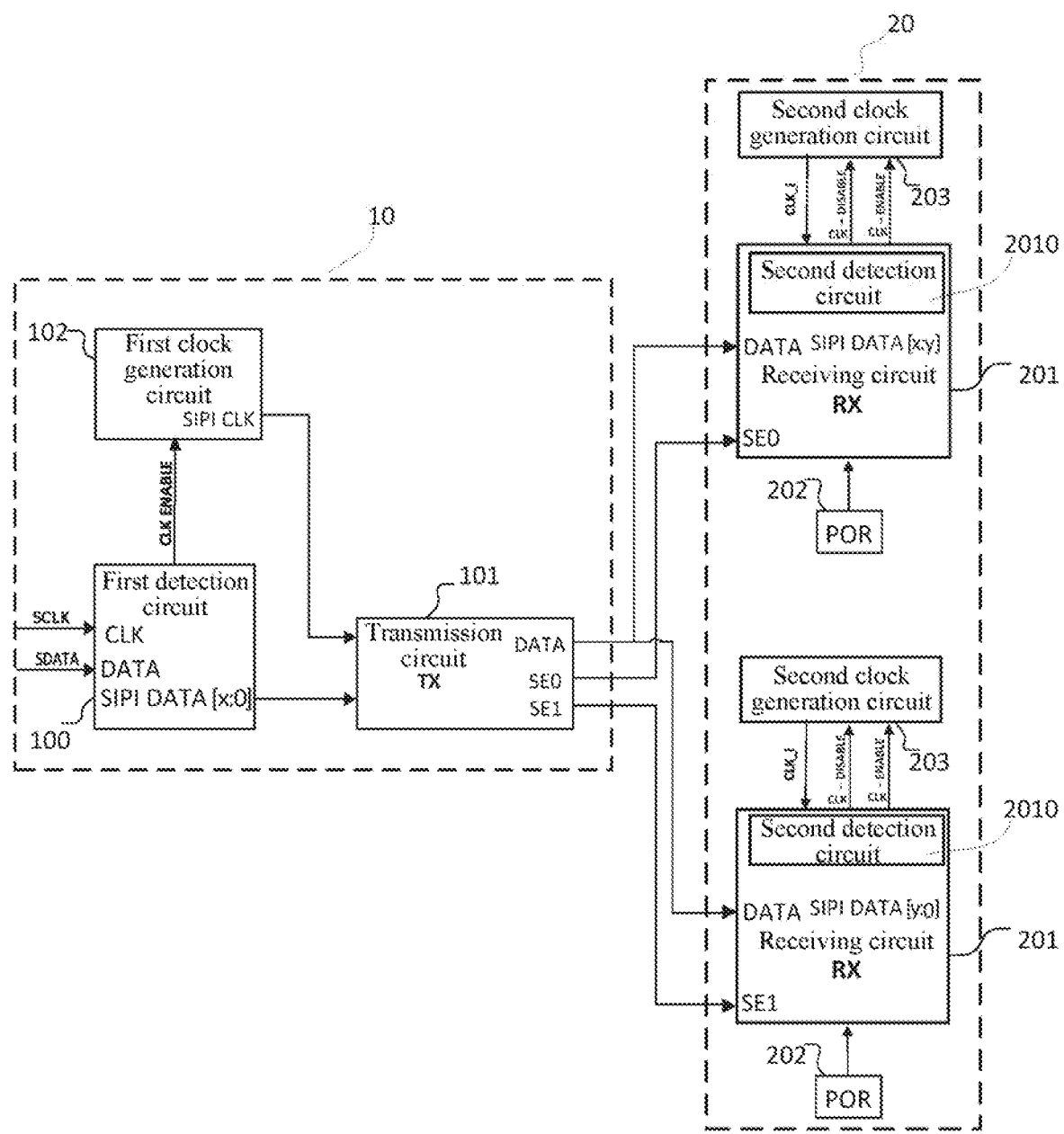
FIG. 12 is schematic circuit diagram 2 of the serial communication apparatus according to Embodiment 3 of the present invention.

For example, as shown in FIG. 12, assuming that valid SIPI data DATA[x:0] required by the radio frequency device 20 is split into valid SIPI data DATA[x:y] and valid SIPI data DATA[y:0], a number of the second output interfaces of the transmission circuit 101 and a number of the receiving circuits are respectively increased to two, that is, the second output interfaces of the transmission circuit 1011 are a second output interface SE0 and a second output interface SE1, and the receiving circuits are a receiving circuit 201' and a receiving circuit 201". The second output interface SE0 is connected to the second input interface SE of the receiving circuit 201' via the second signal bus SB, the second output interface SE1 is connected to the second input interface SE1 of the receiving circuit 201" via the second signal bus SB, and the first output interface DATA of the transmission circuit 101 is connected to first input interfaces DATA of the receiving circuit 201' and the receiving circuit 201" via the first signal bus SA.

The second power-on reset circuit 202 generates reset signals to respectively reset the receiving circuit 201' and the receiving circuit 201", so that the reset receiving circuit 201' and the receiving circuit 201" are to receive valid SIPI data. In this case, by means of the first detection circuit 100, the system clock signal SCLK and the system data signal SDATA transmitted by the main control module is received, and the received system clock signal SCLK and system data signal SDATA are detected and decoded in real time, and it may be determined whether the latest valid SIPI data DATA[x:0] for the radio frequency device 20 is present through address information pre-stored in the first detection circuit 100 matching the radio frequency device 20. In the presence of the latest valid SIPI data DATA[x:0] for the radio frequency device 20, the first clock generation circuit 102 is controlled to generate a first clock signal (an SIPI clock signal) with a specific frequency for the transmission circuit 101 by enabling the clock signal and disabling the clock signal correspondingly through the clock enable bus CLK_ENABLE, and the latest valid SIPI data DATA[x:0] is transmitted to the transmission circuit 101, so that the transmission circuit 101 extracts the valid SIPI data DATA[x:y] and the valid SIPI data DATA[y:0] according to the first clock signal through sampling and then transmits the valid SIPI data to DATA[x:y] and the valid SIPI data DATA[y:0] to the receiving circuit 201' and the receiving circuit 201" respectively through encoding, sorting, interception, encryption, or the like. The receiving circuit 201' and the receiving circuit 201" may control, according to a received data frame header signal or data frame tail signal of the valid SIPI data, the second clock generation circuit 203 to generate a second clock signal CLK_i (an SIPI clock signal) with a specific frequency for the receiving circuit 201' and the receiving circuit 201" by enabling the clock signal and disabling the clock signal correspondingly through the clock enable bus CLK_ENABLE and the clock enable bus CLK_DISABLE, so that the second detection circuit 2010 extracts the valid SIPI data according to the second clock signal through sampling, and then decodes and configures the valid SIPI data (configuration of various functions), thus enabling the radio frequency device 20 to update the valid SIPI data synchronously in real time.

In addition, in order to simplify complexity of the communication between the radio frequency front-end module 10 and the radio frequency devices 20 and to transmit more valid SIPI data to the radio frequency devices at higher transmission efficiency, the transmission circuit 101 may adopt a unified dual output interface (a first output interface DATA and a second output interface SE). For example, as shown in FIG. 13, assuming that all valid SIPI data required by all of radio frequency devices 20 is DATA[x:0], the second power-on reset circuit 202 generates reset signals to respectively reset the receiving circuits 201, so that the reset receiving circuits 201 are to receive the valid SIPI data. In this case, by means of the first detection circuit 100, a system clock signal SCLK and a system data signal SDATA transmitted by the main control module are received, and the received system clock signal SCLK and system data signal SDATA are detected and decoded in real time, and it may be determined whether latest valid SIPI data DATA[x:0] for the radio frequency device 20 is present through address information pre-stored in the first detection circuit 100 matching the radio frequency device 20. In the presence of the latest valid SIPI data DATA[x:0] for the radio frequency device 20, the first clock generation circuit 102 is controlled to generate a first clock signal (an SIPI clock signal) with a specific frequency for the transmission circuit 101 by enabling the clock signal and disabling the clock signal correspondingly through the clock enable bus CLK_ENABLE, and the latest valid SIPI data DATA[x:0] is transmitted to the transmission circuit 101, so that the transmission circuit 101 extracts the valid SIPI data DATA[x:0] according to the first clock signal through sampling and then transmits the valid SIPI data to DATA[x:0] to the receiving circuits 201 via the first output interface DATA and the second output interface SE respectively through encoding, sorting, interception, encryption, or the like. Each of the receiving circuits 201 may control, according to a received data frame header signal or data frame tail signal of the valid SIPI data, the second clock generation circuit 203 to generate a second clock signal CLK_i (an SIPI clock signal) with a specific frequency for the receiving circuit 201 by enabling the clock signal and disabling the clock signal respectively through the clock enable bus CLK_ENABLE and the clock enable bus CLK_DISABLE, so that the second detection circuit 2010 extracts the valid SIPI data according to the second clock signal through sampling, and then decodes and configures the valid SIPI data (configuration of various functions), thus enabling the radio frequency devices 20 to update the valid SIPI data synchronously in real time.

The serial communication apparatus provided in the present invention detects and extracts valid SIPI data required by each of the radio frequency devices via the radio frequency front-end module, and transmits the valid SIPI data to each of the radio frequency devices quickly and efficiently in a parallel or cascaded serial manner, which not only satisfies requirements for convenient and fast unidirectional communication between and inside various chips of the radio frequency front-end module, but also reduces communication complexity and increases transmission efficiency.

Figure 14:
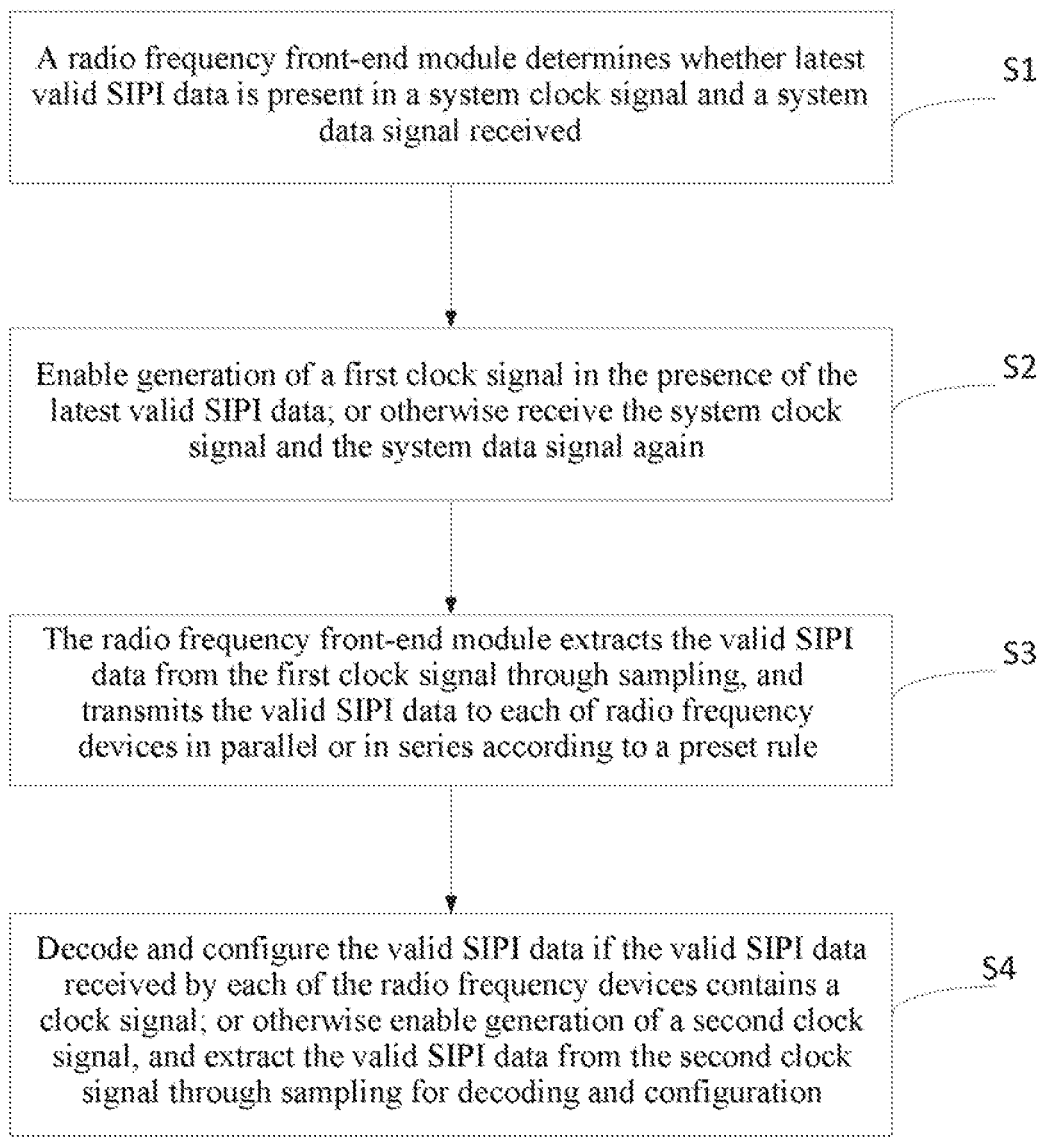
FIG. 14 is a flowchart of a serial communication method according to the present invention.

Based on the serial communication apparatus provided in the above embodiments, the present invention further provides a serial communication method. As shown in FIG. 14, the serial communication method includes the following steps:

Step S1: A radio frequency front-end module determines whether latest valid SIPI data is present in a system clock signal and a system data signal.

Step S2: Enable generation of a first clock signal in the presence of the latest valid SIPI data; or otherwise receive the system clock signal and the system data signal again.

Step S3: The radio frequency front-end module samples and extracts valid SIPI data from the first clock signal, and transmits the valid SIPI data to each of radio frequency devices in parallel or in series according to a preset rule.

Step S4: Decode and configure the valid SIPI data if the valid SIPI data received by each of the radio frequency devices contains a clock signal; or otherwise enable generation of a second clock signal, and extract the valid SIPI data from the second clock signal through sampling for decoding and configuration.

The structures of the radio frequency front-end module and the radio frequency device mentioned in the serial communication method and the serial communication method have been described in detail in the above embodiments, and details are not described herein again.

The serial communication apparatus provided in the present invention may be used in a semiconductor device (for example, a radio frequency chip or a radio frequency module) for transmitting, to the semiconductor device, control information matching the semiconductor device or satisfy requirements for convenient and fast unidirectional communication between and inside the semiconductor devices. A specific structure of the semiconductor device is not described in detail herein again.

The serial communication apparatus and the serial communication method provided in the present invention are described in detail above. For those of ordinary skill in the art, any obvious change made to the present invention without departing from the essence of the invention shall fall within the protection scope of the patent right of the present invention.

What is claimed is:

1. A serial communication apparatus, comprising a radio frequency front-end module and radio frequency devices, wherein a first input interface and a second input interface of the radio frequency front-end module are respectively connected to output interfaces of a main control module, and when a first output interface of the radio frequency front-end module is connected to a first input interface of at least one of the radio frequency devices via a first signal bus, a second output interface of the radio frequency front-end module is connected to a second input interface of the at least one of the radio frequency devices via a second signal bus;

when valid SIPI data received by each of the radio frequency devices contains a clock signal, the radio frequency device comprises a second power-on reset circuit and a receiving circuit, wherein the second power-on reset circuit is connected to the receiving circuit, and when a first input interface of the receiving circuit is connected to a first output interface of a transmission circuit via the first signal bus, a second input interface of the receiving circuit is connected to a second output interface of the transmission circuit via the second signal bus, or the second input interface of the receiving circuit is connected to a corresponding second output interface of the transmission circuit via the second signal bus.

2. The serial communication apparatus according to claim 1, wherein
the radio frequency front-end module comprises a first detection circuit, a first clock generation circuit, and a transmission circuit, wherein a first input interface and a second input interface of the first detection circuit are respectively connected to the output interfaces of the main control module, the first detection circuit is connected to an input interface of the first clock generation circuit via one or more clock enable buses, an output interface of the first clock generation circuit is connected to a first input interface of the transmission circuit, and an output interface of the first detection circuit is connected to a second input interface of the transmission circuit.

3. The serial communication apparatus according to claim 2, wherein
the radio frequency front-end module further comprises a first power-on reset circuit, wherein the first power-on reset circuit is connected to the transmission circuit.

4. The serial communication apparatus according to claim 1, wherein
when valid SIPI data received by each of the radio frequency devices does not contain a clock signal, the radio frequency device comprises a second power-on reset circuit, a receiving circuit, and a second clock generation circuit, wherein the second power-on reset circuit is connected to the receiving circuit, an output interface of the receiving circuit is connected to an input interface of the second clock generation circuit via one or more clock enable buses, an output interface of the second clock generation circuit is connected to an input interface of the receiving circuit, and when a first input interface of the receiving circuit is connected to a first output interface of a transmission circuit via the first signal bus, a second input interface of the receiving circuit is connected to a second output interface of the transmission circuit via the second signal bus, or the second input interface of the receiving circuit is connected to a corresponding second output interface of the transmission circuit via the second signal bus.

5. A serial communication apparatus, comprising a radio frequency front-end module and radio frequency devices, wherein a first input interface and a second input interface of the radio frequency front-end module are respectively connected to output interfaces of a main control module, at least one first output interface of the radio frequency front-end module is connected to a first input interface of at least one of the radio frequency devices via a first signal bus, and at least one second output interface of the radio frequency front-end module is connected to a second input interface of the at least one of the radio frequency devices via a second signal bus;

when valid SIPI data received by each of the radio frequency devices contains a clock signal, the radio frequency device comprises a second power-on reset circuit and a receiving circuit, wherein the second power-on reset circuit is connected to the receiving circuit, a first input interface of the receiving circuit is connected to a corresponding first output interface of a transmission circuit via the first signal bus, and a second input interface of the receiving circuit is connected to a corresponding second output interface of the transmission circuit via the second signal bus.

6. The serial communication apparatus according to claim 5, wherein when valid SIPI data received by each of the radio frequency devices does not contain a clock signal, the radio frequency device comprises a second power-on reset circuit, a receiving circuit, and a second clock generation circuit, wherein the second power-on reset circuit is connected to the receiving circuit, an output interface of the receiving circuit is connected to an input interface of the second clock generation circuit via one or more clock enable buses, an output interface of the second clock generation circuit is connected to an input interface of the receiving circuit, a first input interface of the receiving circuit is connected to a corresponding first output interface of a transmission circuit via the first signal bus, and a second input interface of the receiving circuit is connected to a corresponding second output interface of the transmission circuit via the second signal bus.

7. The serial communication apparatus according to claim 5, wherein the radio frequency front-end module comprises a first detection circuit, a first clock generation circuit, and a transmission circuit, wherein a first input interface and a second input interface of the first detection circuit are respectively connected to the output interfaces of the main control module, the first detection circuit is connected to an input interface of the first clock generation circuit via one or more clock enable buses, an output interface of the first clock generation circuit is connected to a first input interface of the transmission circuit, and an output interface of the first detection circuit is connected to a second input interface of the transmission circuit.

8. The serial communication apparatus according to claim 7, wherein the radio frequency front-end module further comprises a first power-on reset circuit, wherein the first power-on reset circuit is connected to the transmission circuit.

9. A serial communication apparatus, comprising a radio frequency front-end module and radio frequency devices, wherein a first input interface and a second input interface of the radio frequency front-end module are respectively connected to output interfaces of a main control module, a first output interface of the radio frequency front-end module is connected to a first input interface of a first one of the radio frequency devices via a first signal bus, a second output interface of the radio frequency front-end module is connected to a second input interface of the first one of the radio frequency devices via a second signal bus, and starting from the first one of the radio frequency devices, the radio frequency devices are successively connected via the first signal bus and the second signal bus respectively;

when valid SIPI data received by each of the radio frequency devices contains a clock signal, the radio frequency device comprises a second power-on reset circuit and a receiving circuit, wherein the second power-on reset circuit is connected to the receiving circuit, a first input interface of the receiving circuit of the first one of the radio frequency devices is connected to a first output interface of a transmission circuit via the first signal bus, a second input interface of the receiving circuit of the first one of the radio frequency devices is connected to a second output interface of the transmission circuit via the second signal bus, and starting from the first one of the radio frequency devices, the receiving circuits of the radio frequency devices are successively connected via the first signal bus and the second signal bus respectively.

10. The serial communication apparatus according to claim 9, wherein when valid SIPI data received by each of the radio frequency devices does not contain a clock signal, the radio frequency device comprises a second power-on reset circuit, a receiving circuit, and a second clock generation circuit, wherein the second power-on reset circuit is connected to the receiving circuit, an output interface of the receiving circuit is connected to an input interface of the second clock generation circuit via one or more clock enable buses, an output interface of the second clock generation circuit is connected to an input interface of the receiving circuit, a first input interface of the receiving circuit of the first one of the radio frequency devices is connected to a first output interface of a transmission circuit via the first signal bus, a second input interface of the receiving circuit of the first one of the radio frequency devices is connected to a second output interface of the transmission circuit via the second signal bus, and starting from the first one of the radio frequency device, the receiving circuits of the radio frequency devices are successively connected via the first signal bus and the second signal bus respectively.

11. The serial communication apparatus according to claim 9, wherein the radio frequency front-end module comprises a first detection circuit, a first clock generation circuit, and a transmission circuit, wherein a first input interface and a second input interface of the first detection circuit are respectively connected to the output interfaces of the main control module, the first detection circuit is connected to an input interface of the first clock generation circuit via one or more clock enable buses, an output interface of the first clock generation circuit is connected to a first input interface of the transmission circuit, and an output interface of the first detection circuit is connected to a second input interface of the transmission circuit.

12. The serial communication apparatus according to claim 11, wherein the radio frequency front-end module further comprises a first power-on reset circuit, wherein the first power-on reset circuit is connected to the transmission circuit.

\* \* \* \* \*